United States Patent
Han et al.

(10) Patent No.: US 10,152,391 B2
(45) Date of Patent: Dec. 11, 2018

(54) SELF-SERVICE TERMINAL (SST) BACKUPS AND ROLLBACKS

(71) Applicant: NCR Corporation, Duluth, GA (US)

(72) Inventors: Richard Han, Scotland (GB); Jinge Dai, Scotland (GB)

(73) Assignee: NCR Corporation, Atlanta, GA (US)

( * ) Notice: Subject to any disclaimer, the term of this patent is extended or adjusted under 35 U.S.C. 154(b) by 153 days.

(21) Appl. No.: 14/193,045

(22) Filed: Feb. 28, 2014

(65) Prior Publication Data

US 2015/0248336 A1 Sep. 3, 2015

(51) Int. Cl.
G06F 11/14 (2006.01)
G07F 19/00 (2006.01)

(52) U.S. Cl.
CPC ...... G06F 11/1469 (2013.01); G06F 11/1464 (2013.01); G07F 19/206 (2013.01); G07F 19/209 (2013.01)

(58) Field of Classification Search
CPC .. G06F 11/1469; G06F 19/209; G06F 19/206; G06F 11/1464; G07F 19/206; G07F 19/209
See application file for complete search history.

(56) References Cited

U.S. PATENT DOCUMENTS

| | | | |
|---|---|---|---|
| 7,165,081 B2 * | 1/2007 | Chen | G06F 11/1417 |
| 7,334,157 B1 * | 2/2008 | Graf | G06F 8/63 |
| | | | 714/13 |
| 8,015,455 B1 | 9/2011 | Vannatter et al. | |
| 8,589,731 B1 | 11/2013 | Munson et al. | |
| 2005/0251636 A1 * | 11/2005 | Suzuki | G06F 11/2064 |
| | | | 711/162 |
| 2007/0055969 A1 * | 3/2007 | Yang | G06F 11/1433 |
| | | | 717/168 |
| 2008/0059732 A1 * | 3/2008 | Okada | G06F 11/1471 |
| | | | 711/162 |
| 2009/0037750 A1 * | 2/2009 | Boerger | G06F 17/30067 |
| | | | 713/300 |
| 2010/0007047 A1 | 1/2010 | Lau | |
| 2010/0125841 A1 * | 5/2010 | Bauer | G06F 11/1433 |
| | | | 717/174 |
| 2012/0203742 A1 * | 8/2012 | Goodman | G06F 11/1451 |
| | | | 707/646 |

* cited by examiner

*Primary Examiner* — David Yi
*Assistant Examiner* — Zubair Ahmed
(74) *Attorney, Agent, or Firm* — Schwegman, Lundberg & Woessner

(57) ABSTRACT

Self-Service Terminal (SST) automated backup and rollback techniques and SST are provided. An automated determination is made to back up the SST or a resource of that SST to a base image. An update is made to one or more resources of the SST. Automated tests and metrics are gathered and evaluated based on heuristics specific to the transactional environment of the SST. When the test and metrics fail to pass a threshold, the SST or a resource of the SST is automatically rolled back to the base image.

12 Claims, 4 Drawing Sheets

SELF-SERVICE TERMINAL (SST) BACKUPS AND ROLLBACKS

BACKGROUND

Processing devices and environments are regularly subjected to failures. As a result, enterprises deploy a variety of backup and restore features. In fact, many operating systems (OSs), such as Windows®, provide users with the ability for backups and restores from prior backups.

Backups may be performed in an automated fashion by users as well; however, typically restores are manually initiated after a user selects a desired backup image to restore from or after a user manually determines something is working incorrectly with the user's current version of an OS for his/her device.

Self-Service Terminals (SSTs) and especially Automated Teller Machines (ATMs) present unique challenges for conventional backup and restore operations.

Firstly, an ATM is a highly secure environment with very restrictive access network access and, typically, a service engineer has to manually be present to perform and needed backups or restores. This is time consuming and inefficient.

Secondly, because an ATM is a secure environment; the ATM transactions are restricted; maintenance access is done on at the ATM; customers of the ATM have a limited interface with circumscribed input mechanisms; and the software of the ATM is heavily quality tested, any fault conditions or any resource failures are not as frequent as they occur on other devices and systems. Thus, backups and restores are infrequent. But, this infrequency should not imply that ATMs require no backup and restore capabilities because fault situations can and do occur.

Thirdly, OSs rarely require updates or upgrades in an ATM environment. More frequency, a specific application or resource receives an update or upgrade and most backup services are for an entire OS not for a specific resource. The same is true for restores, where a typical restore will wipe out an entire existing OS environment and replace images of all resources; rather than replace a single resource within an existing OS environment. Furthermore, sometimes in an ATM environment it is not even a resource that is an issue but, rather, a configuration of that resource. Backing up and restoring configurations for an existing resource in an existing OS is not addressed in the industry.

Lastly, what an owner or service engineer of an ATM considers to be a condition on the ATM, which warrants a restore to a prior working image for that ATM, is generally not a true fault condition. For example, a particular application may not fail but may produce incorrect data or diagnostics indicating that something somewhere is wrong but pinpointing the issue can be time consuming and the time spent locating the issue the ATM is offline and not available for customer business.

So, the traditional backup and restore technology are not geared to or focused on the unique challenges associated with SST (and in particular ATM) operations.

SUMMARY

In various embodiments, methods and system for Self-Service Terminal (SST) backups and rollbacks are presented.

According to an embodiment, a method for automated SST backup is provided. A condition that necessitates a backup for an SST is identified. A determination is made as to whether to perform a backup operation relevant to the type.

DETAILED DESCRIPTION

Figure 1:
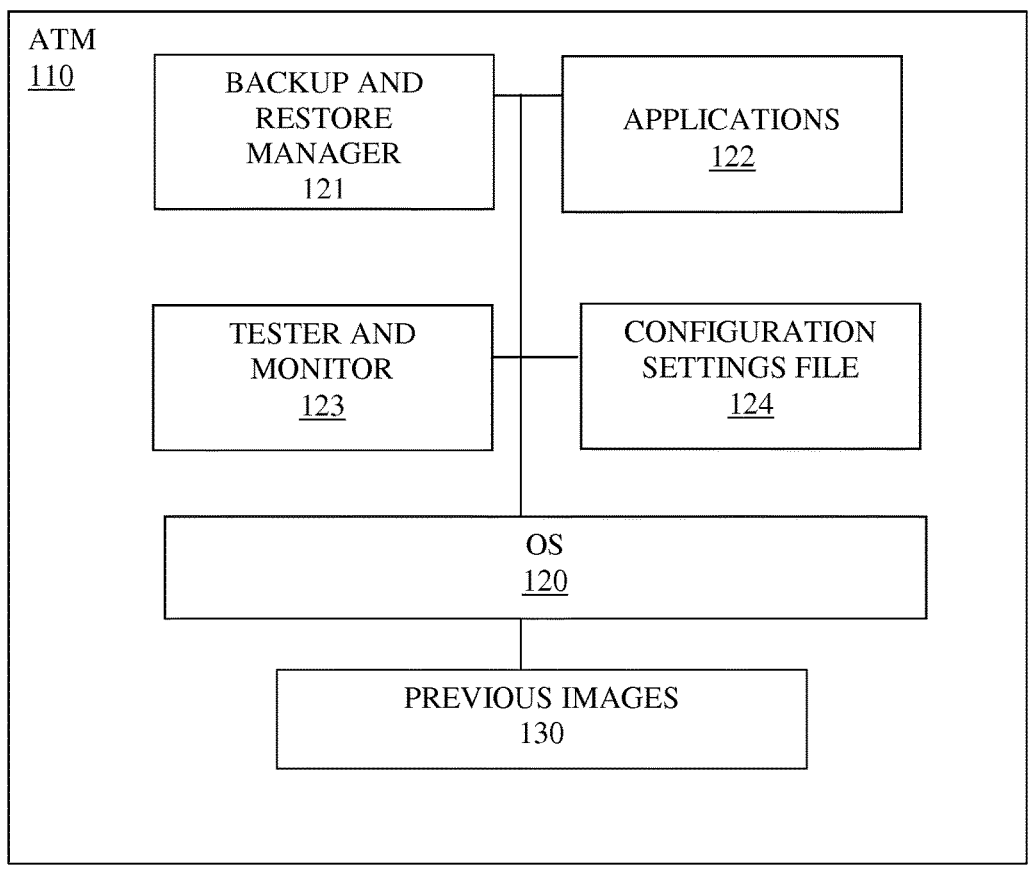
FIG. 1 is a diagram of an Automated Teller Machine (ATM) for practicing custom level backups and restores for resources of that ATM, according to an example embodiment.

FIG. 1 is a diagram of ATM 110 for practicing backups and rollbacks on an Automated Teller Machine (ATM), according to an example embodiment. The ATM 110 is shown schematically in greatly simplified form, with only those components relevant to understanding of this embodiment being illustrated. The same is true for the other components depicted in architecture 100. The various components are illustrated and the arrangement of the components is presented for purposes of illustration only. It is to be noted that other arrangements with more or less components are possible without departing from the ATM 110 backup and rollback techniques presented herein and below.

The techniques, methods, SST, and ATM 110, presented herein and below, for automated backups and rollbacks can be implemented in whole or in part in one, all, or some combination of the components shown with the FIG. 1. The techniques and methods are programmed as executable instructions in memory and/or non-transitory computer-readable storage media and processed on one or more processors associated with the components (may also be referred to as "modules").

The ATM 110 includes: an OS 120, at least one previous image 130, a backup and restore manager 121, a variety of applications 122, a tester and monitor 123, and a configuration and settings file 124.

The OS 120 provides the platform for the ATM 110. In an embodiment, the OS 120 is an open source OS (such as Android®, Tizen®, Unix®, Suse®, Linux®, Red Hat®, and others). In an embodiment, the OS 120 is a proprietary OS (such as Windows®, iOS®, Blackberry®, and others).

The OS 120 is the platform and processing environment for the backup and restore manager 121, the applications 122, the tester and monitor 123, and configuration and settings file 124. The OS 120 abstracts the hardware resources of the ATM 110 and manages those resources on behalf of the OS software resources (121, 122, and 123) and OS file or data resources (124).

A "resource" can be physical, such as communication ports, processors, memory, storage, integrated or interfaced peripheral devices, and the like. A "resource" can also be a software component or a storage file or data store. A "resource" can also be a composite resource that includes groupings of other resources. Moreover, a "resource" can be a sub-file within a file that is organized as a set of files.

The backup and restore manager 121 is responsible for automatically determining when an image of an OS resource (121-124) is to be imaged (backed up) to the previous images 130 and when the entire OS 120 is to be imaged to the previous images 130.

As used herein, the word "restore" may be used interchangeably and synonymously with the word "rollback." Moreover, an "image" is a compressed or uncompressed version of a software or a file resource that is capable of being installed on the ATM 110.

The backup image be based on a specific one of the applications 122, a set of the applications 122, configuration and/or settings for a specific application 122 (or set of applications) as housed in the configuration and settings file 124 (as sub files), or the OS 120 as a whole.

The backup and restore manager 121 determines what type of backup image to generate based on a variety of customizable heuristics or factors. Data relevant to evaluating the customizable heuristics are provided by the tester and monitor 123 to the backup and restore manager 121.

The tester and monitor 123 can perform a variety of monitoring and testing that can be configured to the processing environment and needs of the enterprise owning or servicing the ATM 110.

For example, the tester and monitor 123 can monitor for each of the applications or two or more of the applications interacting with one another: cache or memory usage; processor usage; bandwidth usage; storage usage; response times; connection data; data quality (based on test transactions performed); security processing; and the like. The data captured by the tester and monitor 123 during monitoring activities is referred to as application metrics. The metrics may be logged to a file (not shown in the FIG. 1) and/or passed in real-time to the backup and restore manager 121.

The tester and monitor 123 can also perform configured tests on each of the applications 122 and on two or more of the applications 122 in combination with one another and while interacting with one another. The tests can include: mock transactions, mock operations, mock sets of operations, mock connections, and the like. The data gathered by the tester and monitor 123 is referred to herein as diagnostics.

The tester and monitor 123 can also gather metrics and diagnostics for the OS 120 as a whole.

The tester and monitor 123 can be configured to be executing continuously on the ATM 110 and to target and report diagnostics and metrics with more granularity and greater frequency when an update or upgrade occurs with one or more of the applications 122 and/or the OS 120.

Whenever an application 122 is to be updated or upgraded for features related to its source code or for its configuration or settings, the backup and restore manager 121 ensures that its present source code or its present configuration or settings are up-to-date in the previous images file 130. The same holds true for the OS 120. So, the type of backup selected by the backup and restore manager 121 is dependent on what the proposed change is to the ATM 110. If the change is to an application's source, the previous images are checked to determine if a current source for that application 122 is imaged. If the change is to an application's configuration and/or settings located in the configuration and settings file 124, the previous images are checked to determine if current configuration and settings data is present. When current versions of the images are not present in the previous images file 130, the backup and restore manager initiates the backup to produce the appropriate image based on the change to the previous images file 130. Note the reason why a current image may not be present in the previous images file 130 is because the application 122 may be having a backup processed for the first time. Also, the discussion above with respect to the actions of the backup and restore manager 121 apply equally with respect to changes to the OS 120.

So, based on the change to a resource (120, 122, or 124) of the ATM 110, the backup and restore manager 121 determines a type of backup or image to take (specific application 122 or set of applications 122, configuration and settings file 124, or OS 120 as a whole). For a first time that a resource (120, 122, or 124) is being backed up the backup is then processed. The usage of the type provides a granularity to backups that has heretofore not be capable in the industry.

In an embodiment, any image taken by the backup and restore manager 121 after a first image (base image) has already been taken by the backup and restore manager 121 for a resource (120, 122, or 124), the changes to the base image are noted as deltas within the base image. This means that just changes are made to the base image for subsequent images associated with that base image. This can save a considerable about of storage space on the ATM 110.

In an embodiment of the previous embodiment, the deltas to the base image are stored external to the ATM 110 on a device or transmitted from the ATM 110 over a secure network to a server (the device of server may also have the base images (not shown in the FIG. 1)).

In an embodiment, each image within the previous images file 130 is digitally signed by a trusted entity and that signature verified before being used with any restore operation of the backup and restore manager 121.

The backup and restore manager 121 receives the metrics and diagnostics on a regular (configured period of time) and compares their values against predefined threshold values. When a particular application 122, set of applications 122, or the OS 120 fail a comparison, the backup and restore manager initiates a restore.

The backup and restore manager 121 also monitors specific resources (120, 122, and 124) when known changes were being proposed to those resources. In other words, when the backup and restore manager 121 checked for a current image of a resource 120, 122, or 124 (because of a change (update, upgrade, or change in the configuration and settings) and performed a backup if required), the backup and restore manager 121 noted the change and affected resources and the backup and restore manager 121 has access to previous metrics and diagnostics for those resources before that change. Thus, the backup and restore manager 121 can compare the previous metrics and diagnostics to new metrics and diagnostics after the change is applied and can automatically determine which resource (120, 122, or 124) is performing differently; this difference can be compared to threshold values to make an automated determination as to which resource needs rollback and rolled back in which manner (for example application 122 had configurations changed which now has the OS 120 performing poorly, so a last image for that application's configuration needs to be acquired from the previous images file 130 and reinstated in the configuration and settings file 124 and applied to the application 122).

So, dependencies can also be automatically discovered (in the example, the configuration of the application 122 altered the performance of another resource, namely the OS 120—so there is a dependency between the configuration of the application 122 and the performance of the OS 120).

This was but one example of one restore operation and many other scenarios can occur. The backup and restore manager 122 permits automated fine grain and coarse grain backups and restores to resources of the ATM 110. Moreover, resource dependencies can be automatically discovered and noted in log files to improve on maintenance and support of the resources (120, 122, and 124) and the ATM 110 as a whole.

The techniques demonstrate how maintenance and support can be achieved more efficiently and in a customized manner to the operational environment of an ATM 110. Such approaches do not exist in the industry, since, generally, each approach attempts to provide a single solution to all industries with little to no control over the granularity of the backups and restores and with little to no ability to automatically discover underlying relationships between resources of the environment being backed up or restored.

Figure 2:
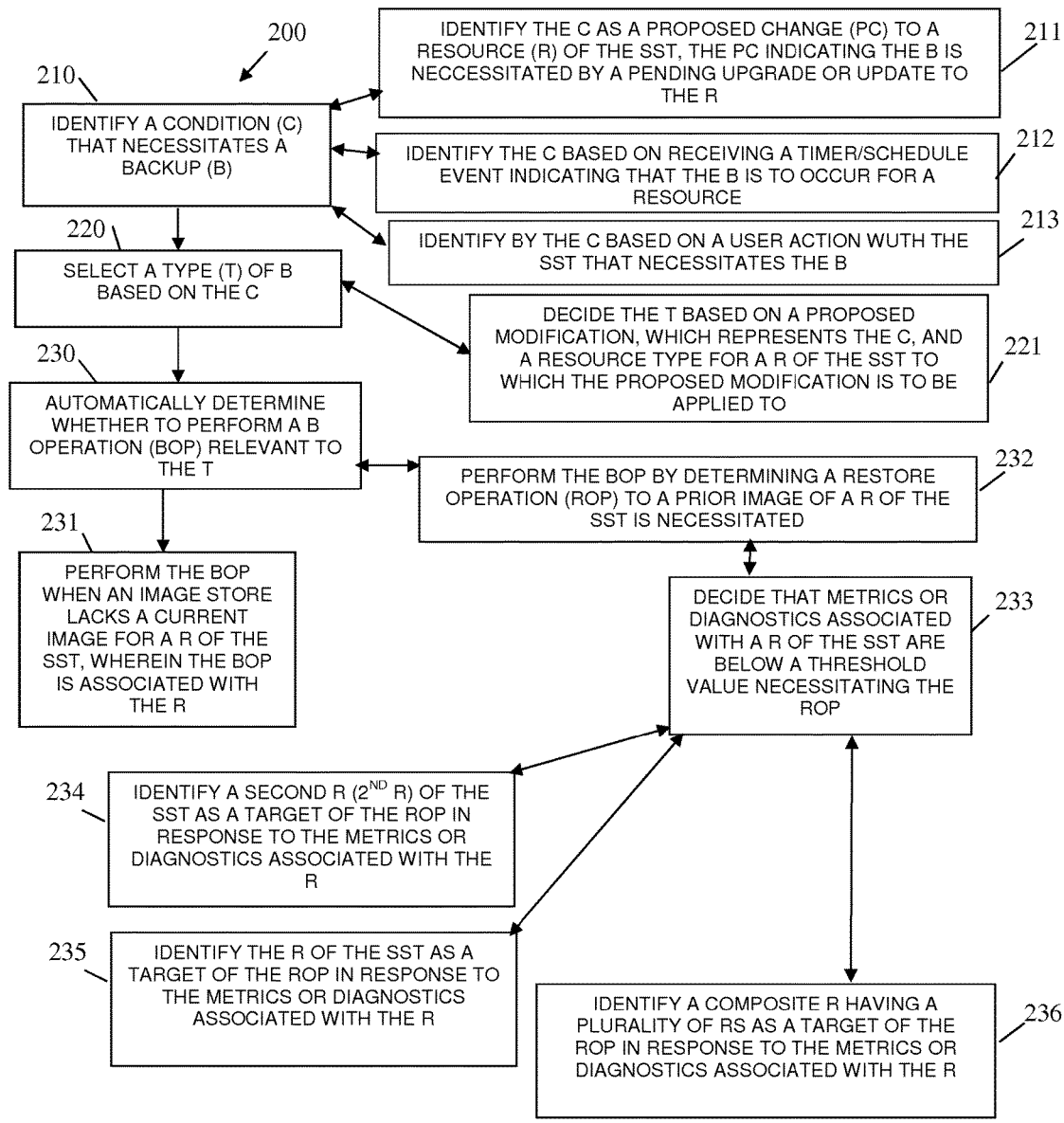
FIG. 2 is a diagram of a method for an automated Self-Service Terminal (SST) backup, according to an example embodiment.
Figure 3:
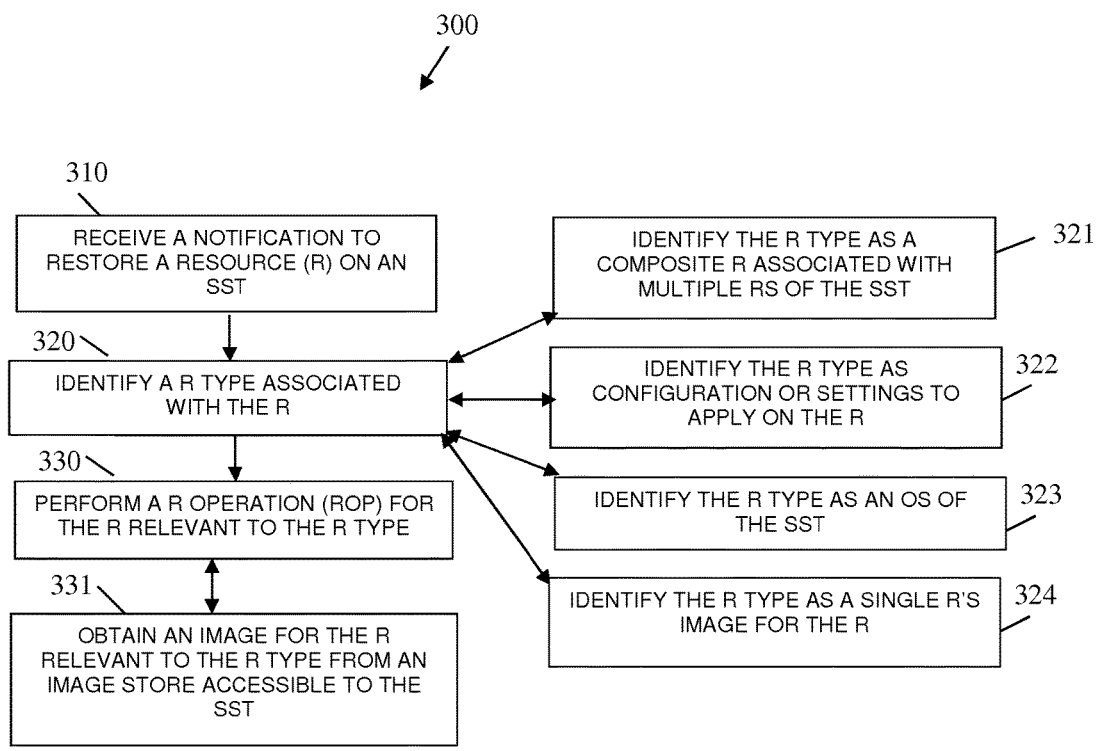
FIG. 3 is a diagram of a method for automated SST rollback, according to an example embodiment.
Figure 4:
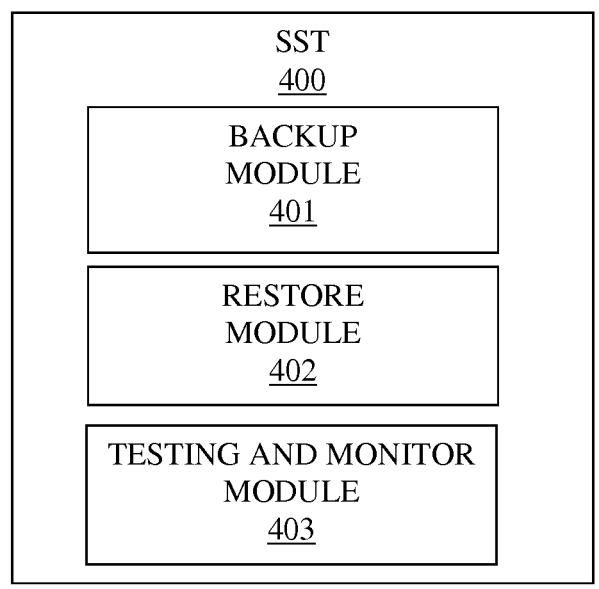
FIG. 4 is a diagram of an automated SST backup and rollback system, according to an example embodiment.

Some of the above-discussed embodiments and other embodiments of the invention are now presented with the discussions of the FIGS. 2-4.

FIG. 2 is a diagram of a method 200 for an automated Self-Service Terminal (SST) backup, according to an example embodiment. The software module(s) that implements the method 200 is referred to as a "SST backup manager." The SST backup manager is implemented as executable instructions programmed and residing within memory and/or a non-transitory computer-readable (processor-readable) storage medium and executed by one or more processors of the SST. The processors of the SST that executes SST backup manager are specifically configured and programmed to process the SST backup manager. The SST backup manager may or may not have access to one or more networks during its processing. The networks can be wired, wireless, or a combination of wired and wireless.

In an embodiment, the SST that executes the SST backup manager is the ATM 110 of the FIG. 1.

In an embodiment, the SST that executes the SST backup manager is a kiosk.

In an embodiment, the SST backup manager is an enhanced version of the backup and restore manager 121 of the FIG. 1 for the portion of the backup and restore manager 121 that performs backup operations and makes decisions as to when restore operations are to be initiated.

At 210, the SST backup manager identifies a condition that necessitate a backup. The condition can be identified based on an Application Programming Interface (API) from an automated service or application interfaced to the SST, can be identified based on actions of an authorized user of a Graphical User Interface (GUI) to an application of the SST, or can be initiated automatically by autonomous decisions made by the SST backup manager (as discussed below). Moreover, the target of the backup may, in some cases, to be automatically determined by the SST backup manager (as discussed below).

In an embodiment at 211, the SST backup manager identifies the condition based on a proposed change to a resource of the SST. This proposed change indicates the backup operation (discussed at 230) is necessitated. In an embodiment, the SST backup manager monitors resources and interacts with components of the OS and/or file system for the SST to receive notice of the proposed change and an identifier for the resource. In an embodiment, the SST backup manager includes a GUI interface that acts as a wrapper around any operation of the SST that could make the proposed change. This proposed change may include, but is not limited to, update or upgrade to an application or the OS (type of resource), change to the application or OS configuration or settings in a configuration and settings file (another type of resource), and the like. Other techniques may be used as well to resolve the proposed change and the resource to which the proposed change is to be applied.

In an embodiment, at 212, the SST backup manager identifies the condition by receiving a timer/schedule event (such as from another application resource or from a configuration of the backup manager), which indicates that a backup is to occur for a certain resource and the backup is to be of a certain backup type (OS level, application level, configuration or setting level).

According to an embodiment, at 213, the SST backup manager identifies the condition based on a user's action with the SST that necessitates the backup. The user's action can occur with the SST through interaction with resources while the user is at the SST accessing one or more interfaces of the SST. Alternatively, the user's action can occur with the SST through interaction with resources while the user using an interface to remotely access the SST.

At 220, the SST backup manager selects a type of backup based on the condition. That is, the type can be fine grain or coarse grain and associated with a single resource, composite resources, and/or configurations or settings that are applied to a single resource of composite resource.

According to an embodiment, at 221, the SST backup manager decides the type of backup based on a proposed modification, which represents the condition, and based on a resource type for the resource of the SST to which the proposed modification is to be applied. For example, if the condition is a change to an identifier that represents a configuration or setting of an application, then the backup type is a fine-grain backup where just a current configuration or setting for that application is to be backed up.

At 230, the SST backup manager automatically determines whether to perform a backup operation relevant to the backup type. A backup operation is the actual set of processes to manage no further changes to a target resource of the backup (while, perhaps, still granting concurrent access to that target resource during the process) for purposes of imaging the target resource.

According to an embodiment, at 231, the SST backup manager performs the backup operating when an image store lacks a current image for a resource of the SST that is the target of the backup operation.

In an embodiment, at 232, the SST backup manager performs the backup operation by determining a restore operation to a prior image of a resource of the SST is necessitated. So, the SST backup manager can independently determine that a resource is needed.

In an embodiment of 232 and at 233, the SST backup manager decides that metrics and/or diagnostics associated with a resource of the SST are below a threshold value necessitating the restore operation.

In an embodiment of 233 and at 234, the SST backup manager identifies a second resource of the SST as a target of the restore operation in response to the metrics and/or diagnostics associated with the resource. For example, suppose the resource of 232 has subpar performance, but the SST backup manager can ascertain from a log record that the last change before the subpar performance was made to a second resource, and then the SST backup manager can automatically determine that the second resource is what needs restore to its prior version. This is an autonomous and automated decision by the SST backup manager.

In another case of 233 and at 235, the SST backup manager identifies the resource associated with the subpar metrics and/or diagnostics is the actual resource that needs to be restored to its prior version.

In yet another situation of 233 and at 235, the SST backup manager identifies the resource associated with the subpar metrics and/or diagnostics is a composite resource (groupings of SST resources) needs restored.

FIG. 3 is a diagram of a method 300 for automated SST rollback, according to an example embodiment. The software module(s) that implements the method 300 is referred to as an "SST restore manager." The SST restore manager is implemented as executable instructions programmed and residing within memory and/or a non-transitory computer-readable (processor-readable) storage medium and executed by one or more processors of an SST. The processors of the SST that executes the SST restore manager are specifically configured and programmed to process the SST restore manager. The SST restore manager may or may not have access to one or more networks during its processing. The networks can be wired, wireless, or a combination of wired and wireless.

In an embodiment, the SST that executes the SST restore manager is the ATM 110 of the FIG. 1.

In an embodiment, the SST that executes SST restore manager is a kiosk.

In embodiment, the SST restore manager is an enhanced version of the backup and restore manager 121 of the FIG. 1 for that portion of the backup and restore manager 121 that performs restore operations.

At 310, SST restore manager receives a notification to restore a resource on the SST to its most recent known acceptable working version.

In an embodiment, this notification is received from the backup manager of the FIG. 2.

In an embodiment, this notification is received from an API of another application.

In an embodiment, this notification is triggered remotely from a management console.

In an embodiment, this notification is received from a user interfaced to the SST restore manager via a GUI.

At 320, the SST restore manager identifies a resource type associated with the resource. This resource type identifies the granularity of the resource to perform.

According to an embodiment, at 321, the SST restore manager identifies the resource type as a composite resource associated with multiple resources of the SST (for example two or more other resources).

In an embodiment, at 322, the SST restore manager identifies the resource type as a configuration and/or settings to apply on the resource. Essentially, the resource is attributes of another resource.

In an embodiment, at 323, the SST restore manager identifies the resource type as an OS of the SST (all software and file resources combined for the SST).

In an embodiment, at 324, the SST restore manager identifies the resource type as a single resources executable image for the resource.

At 330, the SST restore manager performs the restore operation for the resource, which is relevant to the resource type.

According to an embodiment, at 331, the SST restore manager obtains an image for the resource relevant to the resource type from an image store accessible to the SST.

FIG. 4 is a diagram of an SST 400, according to an example embodiment, according to an example embodiment. The components of the SST 400 are programmed and reside within memory and/or a non-transitory computer-readable medium and execute on one or more processors of the SST 400. The SST 400 has access and can communicate over one or more networks; and the networks can be wired, wireless, or a combination of wired and wireless.

The SST 400 includes a backup module 401, and a restore module 402, and, optionally, a testing and monitor module 403.

In an embodiment, the SST 400 is the ATM 110.

In an embodiment, the SST 400 is a kiosk.

The SST 400 includes one or more processors, memory, non-transitory computer-readable storage media, and a variety of other resources.

The backup module 401 is configured or operable to execute on one or more processors of the SST 400 and determine that a backup operation for a resource of the SST 400 is necessitated. The backup module 401 is also operable to resolve a backup type for the resource and decide whether the backup operation is necessitated based on inspection of an image store associated with that resource.

According to an embodiment, the backup module 401 is further operable to determine that the backup operation is necessitated based on a proposed change to the resource or to a different resource of the SST.

The restore module 402 is configured or operable to execute on one or more processors of the SST 400 and receive a restore request from the backup module 401 and perform a restore operation for the resource based on a resource type relevant to the restore request.

In an embodiment, the SST 400 also includes a testing and monitor module 403. The testing and monitor module 403 is configured or operable to execute on one or more processors of the SST 400 and monitor the resource and other resources of the SST 400 to gather metrics. The testing and monitor module 403 also operable to perform tests on the resource and other resources of the SST 400 to gather diagnostics and operable to assist the backup module 401 in determining whether the restore operation for the resource is to be communicated to the restore module 402.

One now fully appreciates how an autonomous system for an SST can monitor, test, and decide whether backups and restores are needed for resources. Moreover, the granularity level for those backups and restores can be customized for coarse grain applications and fine-grain applications. The above aforementioned techniques provide novel backup and restore solutions customized to SST-based environments.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    identifying, by a backup and restore manager executing on a Self-Service Terminal (SST), a first condition that necessitates a backup of one or more software resources in a first storage location to a second storage location, wherein the one or more software resources include one or more of an operating system, an application, and configuration settings, wherein identifying further includes monitoring the application processing within the operating system and interaction of the application with another one of the one or more software resources processing within the operating system and processing at least a portion of the identifying as a wrapper around any operation of the SST that is capable of making a change to any of the one or more software resources;
    selecting, by the backup and restore manager, a type of backup itemized to the one or more software resources based on the condition, and wherein the type of backup is a fine grain backup or coarse grain backup, wherein the fine grain backup includes updates to configuration files or setting files processed by a particular software resource or a particular combination of the one or more software resources, and wherein the coarse grain backup includes updates to source code with the particular software resource or the particular combination;
    automatically determining, by the backup manager, whether to perform a backup operation relevant to the type;
    identifying, by the backup and restore manager a second condition representing a change in operation of the one or more software resources that necessitates a restore of the one or more software resources on the second storage location to the first storage location, based upon metrics or diagnostics collected in real time for the one or more software resources based on mock operations processed with the one or more software resources and comparing the metrics or the diagnostics for the mock operations against predefined threshold values for evaluating the second condition, and processing at least one mock operation as a configured test between at least two of the one or more software resources that test interactions between the at least two of the one or more software resources; and
    automatically determining, by the backup and restore manager, whether to perform a restore operation itemized to the one or more software resources based upon the second condition, and wherein automatically determining whether to perform the restore operation includes deciding, by the backup and restore manager, to perform the restore operation when the metrics or the diagnostics are below a threshold value.

2. The method of claim 1, wherein identifying further includes identifying, by the backup and restore manager, the first condition as a proposed change to the one or more resources of the SST, the proposed change indicating to the backup and restore manager that the backup operation is being necessitated by a pending update or upgrade to the one or more resources.

3. The method of claim 1 wherein in identifying further includes, identifying, by the backup and restore manager, the first condition based on receiving a timer/schedule event indicating that the backup is to occur for the one or more resources.

4. The method of claim 1, wherein identifying further includes, identifying, by the backup and restore manager the first condition based on a user action with the SST that necessitates the backup.

5. The method of claim 1, wherein selecting further includes deciding the backup operation based on a proposed modification, which represents the first condition, and a resource type for the one or more resources of the SST to which the proposed modification is to be applied to.

6. The method of claim 1, wherein automatically determining whether to perform a backup operation further includes performing, by the backup and restore manager, the backup operation when the second storage location lacks a current image for the one or more resources of the SST, wherein the backup operation is associated with the one or resources.

7. The method of claim 1, wherein deciding further includes, identifying, by the backup and restore manager a target resource of the one or more resources of the SST for the restore operation in response to the metrics or the diagnostics associated with the target resource.

8. The method of claim 1, wherein deciding further includes, identifying, by the backup and restore manager, another target resource of the one or more resources of the SST for the restore operation in response to the metrics or the diagnostics associated with the other resource.

9. The method of claim 1, wherein deciding further includes, identifying, by the backup and restore manager, a composite resource having a plurality of the one or more resources as a target of the restore operation in response to the metrics or the diagnostics associated with the composite resource.

10. A Self-Service Terminal (SST), comprising:
    a processor configured to execute a backup module operable to: (i) determine a backup operation for a resource of the SST in a first storage location to a second storage location is necessitated, wherein the resource includes one or more of an operating system, an application, and configuration settings, and monitor application processing within the operating system and interaction of the application with another one of the one or more software resources processing within the operating system and process as a wrapper around any operation of the SST that is capable of making a change to the resource, (ii) resolve a backup type itemized to the resource and wherein the backup type is a fine grain backup or coarse grain backup, wherein the fine grain backup includes updates to configuration files or setting files processed by the resource or a particular combination of the resource and other resources, and wherein the coarse grain backup includes updates to source code with the resource or the particular combination, and (iii) decide whether the backup operation is necessitated based on inspection of an image store in the second storage location associated with the resource; and
    the processor being further configured to execute a restore module operable to: (i) receive a restore request for the resource from the backup module to restore the resource from the second storage location to the first storage location in response to metrics gathered in real time for the resource based on mock operations processed with the resource with the metrics compared against predefined threshold values, wherein at least one mock operation is processed as a configured test between the resource and at one additional resource that test interactions between the resource and the at least one additional resources, and (ii) perform a restore operation for the resource based on a restore type itemized to the resource, wherein the perform the restore operation further includes decide to perform the restore operation when the metrics or diagnostics are below a threshold value.

11. The system of claim 10, wherein the processor is further configured to execute a testing and monitor module operable to (i) monitor the resource and other resources of the SST to gather the metrics, (ii) perform tests on the resource and other resources of the SST to gather diagnostics, and (iii) provide the metrics and the diagnostics to the backup module to assist the backup module in determining whether the restore operation is to be communicated to the restore module.

12. The system of claim 10, wherein the backup module is further operable in (ii) to: determine that the backup operation is necessitated based on a proposed change to the resource or to a different resource of the SST.

\* \* \* \* \*